US010940938B2

(12) United States Patent
Servant et al.

(10) Patent No.: US 10,940,938 B2
(45) Date of Patent: Mar. 9, 2021

(54) PITCH-CHANGING SYSTEM EQUIPPED WITH MEANS FOR LUBRICATING A LOAD-TRANSFER BEARING

(71) Applicant: SAFRAN AIRCRAFT ENGINES, Paris (FR)

(72) Inventors: Régis Eugène Henri Servant, Moissy-Cramayel (FR); Anthony Lafitte, Moissy-Cramayel (FR); Eddy Keomorakott Souryavongsa, Moissy-Cramayel (FR); Sébastien Emile Philippe Tajan, Moissy-Cramayel (FR); Arnaud Martin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 197 days.

(21) Appl. No.: 16/327,288

(22) PCT Filed: Aug. 16, 2017

(86) PCT No.: PCT/FR2017/052237
§ 371 (c)(1),
(2) Date: Feb. 21, 2019

(87) PCT Pub. No.: WO2018/037183
PCT Pub. Date: Mar. 1, 2018

(65) Prior Publication Data
US 2020/0172228 A1 Jun. 4, 2020

(30) Foreign Application Priority Data
Aug. 26, 2016 (FR) ...................................... 1657974

(51) Int. Cl.
*B64C 11/38* (2006.01)
*F01D 25/16* (2006.01)
(Continued)

(52) U.S. Cl.
CPC ................ *B64C 11/38* (2013.01); *F01D 7/00* (2013.01); *F01D 25/16* (2013.01); *F01D 25/20* (2013.01);
(Continued)

(58) Field of Classification Search
CPC ........ F01D 25/16; F01D 25/18; F01D 25/186; F01D 25/20; B64C 11/30; B64C 11/38
See application file for complete search history.

(56) References Cited

U.S. PATENT DOCUMENTS 9,708,053 B2 * 7/2017 Curlier .................. B64C 11/306
9,951,651 B2 * 4/2018 Frantz ................. F16C 33/6659
(Continued)

FOREIGN PATENT DOCUMENTS

| CH | 271823 A | 11/1950 |
| WO | 2013050704 A1 | 4/2013 |
| WO | 2014013201 A1 | 1/2014 |

OTHER PUBLICATIONS

International Search Report dated Nov. 15, 2017, issued in corresponding International Application No. PCT/FR2017/052237, filed Aug. 16, 2017, 6 pages.

*Primary Examiner* — Todd E Manahan
*Assistant Examiner* — Thuyhang N Nguyen
(74) *Attorney, Agent, or Firm* — Christensen O'Connor Johnson Kindness PLLC

(57) ABSTRACT

A system for changing the pitch of blades of at least one turbomachine rotor is provided. The system generally includes a control means acting on a connecting mechanism connected to the blades of the rotor and having a body mobile in translation along a longitudinal axis with respect to a fixed body, load-transfer bearing mounted on the mobile body cooperating with the connecting mechanism, and means for lubricating the bearing having a lubricant duct and extending radially above the fixed and mobile bodies. The
(Continued)

duct generally includes first and second telescopic tubular parts that slide coaxially with respect to one another, the first part connected to the fixed body and the second part connected to the mobile body, and means for spraying lubricant into the bearing mounted on the mobile body and lubricant supply conduit mounted on the mobile body to connect the duct to the spraying means.

10 Claims, 7 Drawing Sheets

(51) Int. Cl.
    *F01D 25/20*     (2006.01)
    *F01D 7/00*     (2006.01)
    *F01M 1/02*     (2006.01)
    *B64C 11/30*     (2006.01)
    *F02K 3/062*     (2006.01)

(52) U.S. Cl.
    CPC ............ *F01M 1/02* (2013.01); *B64C 11/306* (2013.01); *F02K 3/062* (2013.01)

(56) References Cited

U.S. PATENT DOCUMENTS

2010/0008779 A1     1/2010   Carvalho
2014/0294585 A1*  10/2014  Escure .................... F02K 3/072
                                                    416/147

* cited by examiner

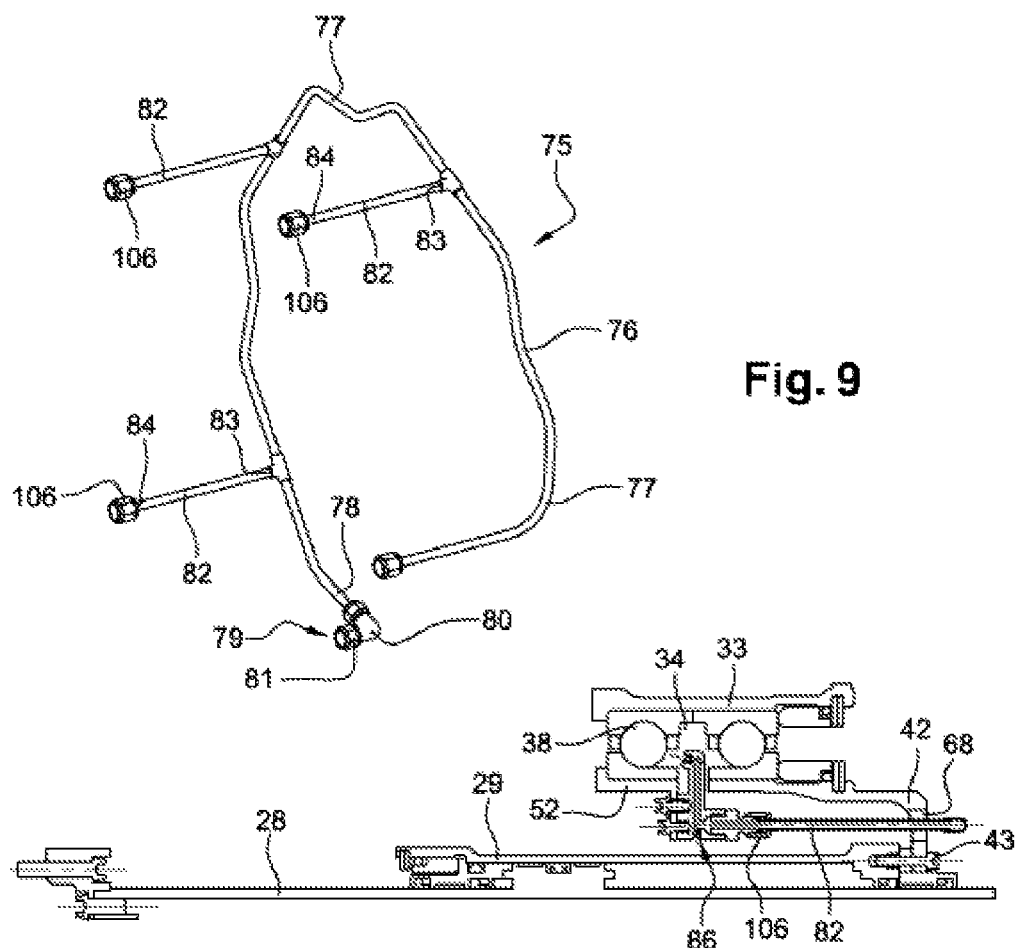
Fig. 9
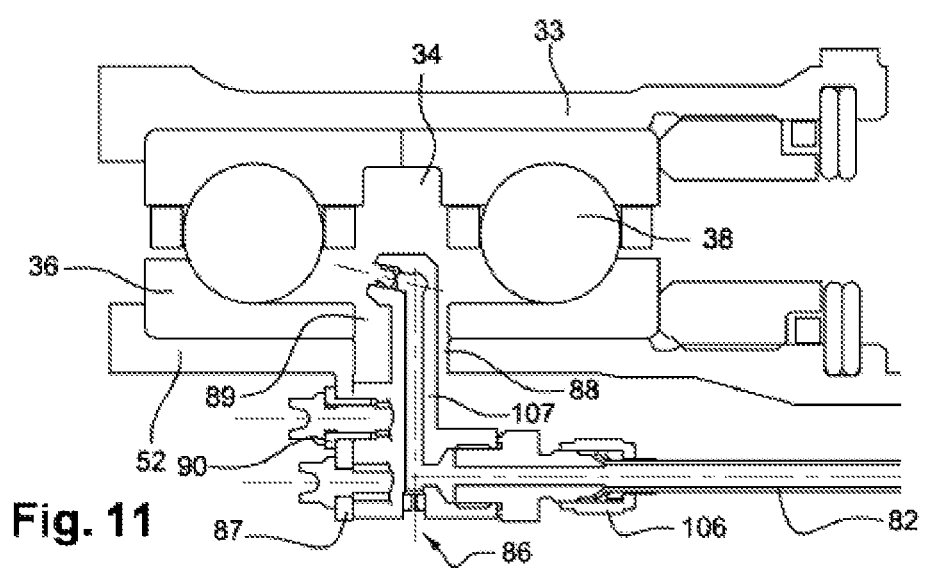
Fig. 10
Fig. 11

PITCH-CHANGING SYSTEM EQUIPPED WITH MEANS FOR LUBRICATING A LOAD-TRANSFER BEARING

1. FIELD OF THE INVENTION

This invention relates to the field of aeronautical propulsion. It relates to a system for changing the pitch of blades of a propeller driven by a turbomachine and in particular means for lubricating a load-transfer bearing of said pitch-changing system.

2. PRIOR ART

The change in pitch or variable timing of blades of a turbomachine propeller is one of the ways to improve the performance and output of turbomachines in different flight conditions.

Turbomachines are known, such as propulsion propeller doublet of a turboprop, for example counter-rotating, referred to as "open rotor" and "unducted fan" provided with these pitch-changing systems. Turboprop are distinguished from turbojets by the use of a propeller outside of the nacelle (non-streamlined) instead of a fan. The pitch-changing system can also apply to a turboprop with a propulsion propeller or be suitable indifferently to one or each propeller.

In a turbine engine of the open rotor type, a gas generator part and a propulsion part are aligned and arranged in a fixed cylindrical nacelle carried by the structure of the aircraft. The gas generator part can be arranged at the front or at the rear of the propulsive part. The propulsive part comprises a of coaxial and counter-rotating propeller doublet, respectively upstream and downstream, which are driven in rotation one opposite the other by a turbine, in particular a low-pressure turbine, of the gas-generating part via a reduction gear, for example, with planetary gears. The propellers extend substantially radially in regard to the transmission shaft with a longitudinal axis outside the nacelle. Generally, each propeller comprises a substantially cylindrical rotating casing carrying a hub with a polygonal outer ring rotationally mounted about the longitudinal axis in the fixed nacelle. The hub comprises radial cylindrical housings distributed over the periphery thereof about the longitudinal axis. Radial axis shafts, perpendicular to the longitudinal axis of the turbomachine, secured to the blade roots are received in the housings of the polygonal rings and also pass through radial passages of the cylindrical casing. Bearings for rotational guiding housed in these radial passages maintain the radial shafts in the passages thereof.

An example of a system for changing the pitch of each propeller is known in document WO2013/1050704. In FIG. 2, this pitch-changing system 23A is installed at the core of the rotating or mobile parts or with for example an annular cylinder 25A for rotationally driving blade roots. The annular cylinder 25A comprises a cylinder 27A mounted on a fixed casing 13A and a mobile piston 29A connected to a connecting mechanism 26A, which is connected to each shaft 47A of radial axis. A cylindrical rotating casing 11A rotates about the fixed casing. For this, at least one bearing 12A is arranged between the fixed casing 13A and the rotating casing 11A. The system further comprises a load-transfer bearing 34A, of which the inner ring is secured to the mobile piston 29A and the outer ring is secured to the connecting mechanism 26A and means for lubricating said bearing 34A. Thanks to a linear displacement of the piston following the fluidic control of the annular cylinder, the system 23A provides a desired angular pivoting of the blades by the connecting mechanism 26A and the load-transfer bearing 34A by varying the pitch thereof.

However, such an architecture involving transforming power coming from the fixed part into a movement on the rotating part of the turbomachine presents many difficulties. One of the difficulties resides in the sizing of the integration of the various elements in this rotating part. This applies in particular to the integration of the means for lubricating the load-transfer bearing, which is subjected to substantial thermal and mechanical stresses. Indeed, this load-transfer bearing, which is intended to take up the thrust forces of the turbomachine, is displaced in translation and in rotation which makes the lubrication of this bearing complex. The small space around the cylinder is constraining for the integration of the means for lubricating that must connect a source of supply located in the fixed part and the load-transfer bearing mounted on the mobile piston. On the other hand, the cylinder is subjected to substantial radial forces of the rotating part that imply deformations of the cylinder as well as problems with the seal, which inevitably are passed on to the means for lubricating said bearing. These efforts are multiplied when the cylinder is such that it participates in a structural role.

3. OBJECTIVE OF THE INVENTION

One purpose of the invention is, in particular, to provide means for lubricating the load-transfer bearing, in particular, of a system for changing the pitch of blades of a propeller of a turbomachine taking account of the difficulties of integration in a congested environment and displacements of the control means.

4. DISCLOSURE OF THE INVENTION

These objectives are achieved, according to the invention, thanks to a system for changing the pitch of blades of at least one turbomachine propeller provided with a plurality of blades, the system comprising:
    a control means acting on a connecting mechanism that is connected to the blades of the propeller, said control means comprising a fixed body and a body which is mobile in translation along a longitudinal axis with respect to said fixed body,
    a load-transfer module arranged between the connecting mechanism and the control means, the load-transfer module comprising at least one load-transfer bearing mounted on the mobile body and cooperating with the connecting mechanism, and
    means for lubricating said bearing,
    the means for lubricating comprising:
    at least one lubricant duct configured to be connected to a source of supply of lubricant, the duct extending radially outside the mobile body with respect to the longitudinal axis and comprising at least first and second tubular parts slidably mounted telescopically with respect to one another along an axis parallel to the longitudinal axis, the first part being connected by a first upstream end to said fixed body and the second part being connected by a first downstream end to the mobile body,
    means for spraying lubricant in at least one bearing that is mounted on said mobile body; and
    at least one conduit for conveying lubricant mounted on the mobile part and configured in such a way as to transfer the lubricant from the lubricant duct to said spraying means.

Thus, this solution makes it possible to achieve the aforementioned objective. The means for lubricating makes it possible to supply the load-transfer bearing regardless of the position of the mobile body on which is mounted the load-transfer bearing. Indeed, the first and second telescopic parts make it possible to accompany and to take up the displacement of the mobile body of the control means in translation and thus enables the circulation of the lubricant from the fixed parts of the turbomachine to the mobile parts, and in particular to the bearing. Moreover, these means for lubricating allow for integration into this cluttered environment without complicating the mounting. To this is added the fact that these means for lubricating are independent, which facilitates their integration into the pitch-changing system and on the control means.

According to another advantageous, but non-limiting feature, the first part slides inside the second part.

According to another aspect of the invention, a first end of the first part is fixed to a connection ring of the fixed body, said ring being secured to a fixed casing of the turbomachine. This ring makes it possible to create the junction between the fixed parts and the mobile parts.

In particular, the control means is mounted in a non-structural manner and separated from the fixed casing, with the fixed body being secured to a cylindrical wall of the fixed casing. This arrangement makes possible on the one hand, a gain in compactness and the passage without risks of a leak from the accessories linked to the supply and to the operation of the control means. The control means of this pitch-changing system is configured in such a way as to no longer support the rotating parts and to no longer be subjected to the radial forces. In particular, the control means are no longer subjected to bending forces, which induced misalignments and harmful leaks for the control means. On the other hand, also thanks to this non-structural arrangement, it is possible to independently manage the integration of the control means and the structure of the fixed and rotating casings.

According to another feature of the invention, the first part is provided in the vicinity of its second free end with at least one first vent hole with a central axis and with a second vent hole with a central axis, said axes being perpendicular to the longitudinal axis and being defined in offset and substantially parallel planes. In this way, the suction phenomena that can intervene during the displacement of the first and second parts in relation to one another are limited. The shift in the vent holes makes it possible to not weaken the first tubular part.

According to another aspect of the invention, the first part is formed from at least one first and one second tubular portions, the first and second tubular portions aligned substantially along the same axis, the first and second tubular portions being connected together by an annular connecting member configured in such a way as to maintain a seal between the first and second portions in case of misalignment. Thus, the annular connecting member makes it possible to maintain the seal between the two tubular portions, while still permitting their misalignment during the displacement of the mobile part. This radial or tangential misalignment is due to the geometrical tolerances of the parts, to the assembly tolerances, as well as to the taking up of the clearances and to the deformation of the parts under the operating loads of the turbomachine.

Advantageously, but in a non-limiting manner, a ball-joint connection is interposed at each free end of the first and second portions, and between the walls of said first and second portions and the annular connecting member. The ball-joint connection is a solution that does not take up much space for resolving the misalignment problems. It also makes it possible to take the various positions of the control means into account, as well as issues relating to the seal at high pressures of about 100 bar.

According to yet another feature of the invention, the load-transfer module comprises an inner ferrule whereon are mounted the spraying means, the inner ferrule being provided with an orifice with a radial axis coaxial to an opening of an inner ring of said bearing, the spraying means extending at least partially through the orifice and the opening. This configuration allows for spraying directly in the bearing and on the bearings.

Advantageously, but in a non-limiting manner, means for centring arranged on the inner ferrule of the bearing are configured to centre and direct the spraying of the spraying means.

According to another feature of the invention, the load-transfer bearing is provided with a double-row bearing and the spraying means comprise at least two nozzles for each row, the nozzles being distributed azimuthally around the longitudinal axis.

According to yet another feature of the invention, the supply conduit comprises an arched tubular body which is arranged at least partially about the mobile body and fixed on a rear face of the inner ferrule.

Advantageously, but in a non-limiting manner, the supply conduit is fixed on the rear face by means of flexible collars. The fastening via a flexible collar is required due to the presence of adjustment means arranged between the mobile body and the fixed body in order to adjust the axial position of the mobile body in relation to the fixed body. Thus, the mobile body can use its full course.

According to yet another feature of the invention, the supply conduit comprises tubes extending along an axis that is substantially parallel to the longitudinal axis, said tubes are connected by a first end to the body of the supply conduit and by a second end to the spraying means.

Advantageously, but in a non-limiting manner, the control means comprises an actuator whose mobile body slides around the cylindrical wall of the fixed casing. In particular, the actuator comprises an annular cylinder.

The invention could also relate to a system for changing the pitch of blades of at least one turbomachine propeller provided with a plurality of blades, the system comprising:
  a control means acting on a connecting mechanism that is connected to the blades of the propeller, said control means comprising a fixed body and a body which is mobile in translation along a longitudinal axis with respect to said fixed body,
  a load-transfer module arranged between the connecting mechanism and the control means, the load-transfer module comprising at least one load-transfer bearing mounted on the mobile body and cooperating with the connecting mechanism, and
  means for lubricating said at least one bearing,
  the means for lubricating comprising at least one lubricant duct configured to be connected to a source of supply of lubricant, the duct extending radially outside the mobile body with respect to the longitudinal axis and comprising at least first and second tubular parts slidably mounted telescopically with respect to one another along an axis parallel to the longitudinal axis, the first part being connected by a first upstream end to said fixed body and the second part being connected by a first end to the mobile body, the first part being formed by at least one first and one second tubular portions aligned substantially along the same axis and which are connected together by an annular connecting member configured in such a way as to maintain the seal between the two portions in case of misalignment of the first part and the second part of the duct.

5. BRIEF DESCRIPTION OF THE FIGURES

The invention shall be better understood, and other purposes, details, characteristics and advantages of the latter shall appear more clearly upon reading the following detailed explanatory description of embodiments of the invention given solely as examples for the purpose of information and in a non-limiting way, and with reference to the accompanying schematic drawings.

In these drawings:

FIG. 1 diagrammatically shows in axial cross-section an example of a turbomachine with a system for changing the pitch of blades of a propeller according to the invention;

FIG. 9 is a perspective view of an example of a supply conduit according to the invention;

FIG. 10 is an axial cross-section view of the control means showing the connection between the supply conduit and spraying means according to the invention;

FIG. 11 shows according to a detailed and axial cross-section an embodiment of the spraying means according to the invention;

6. DESCRIPTION OF EMBODIMENTS OF THE INVENTION

Figure 1:
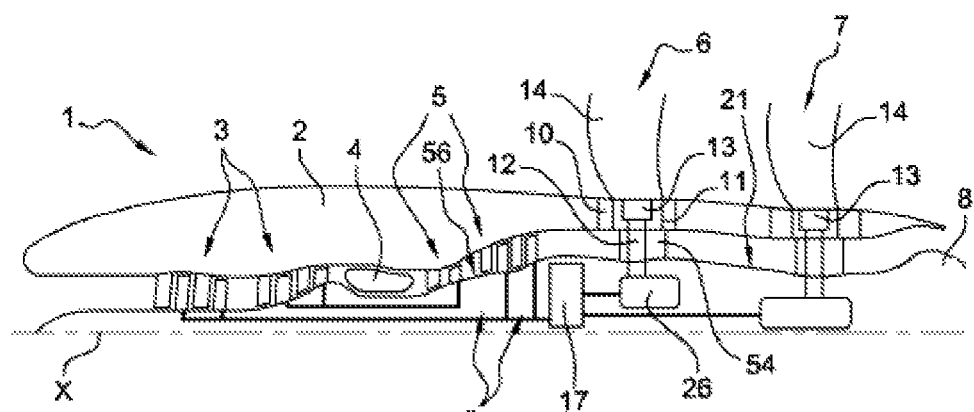
Figure 2:
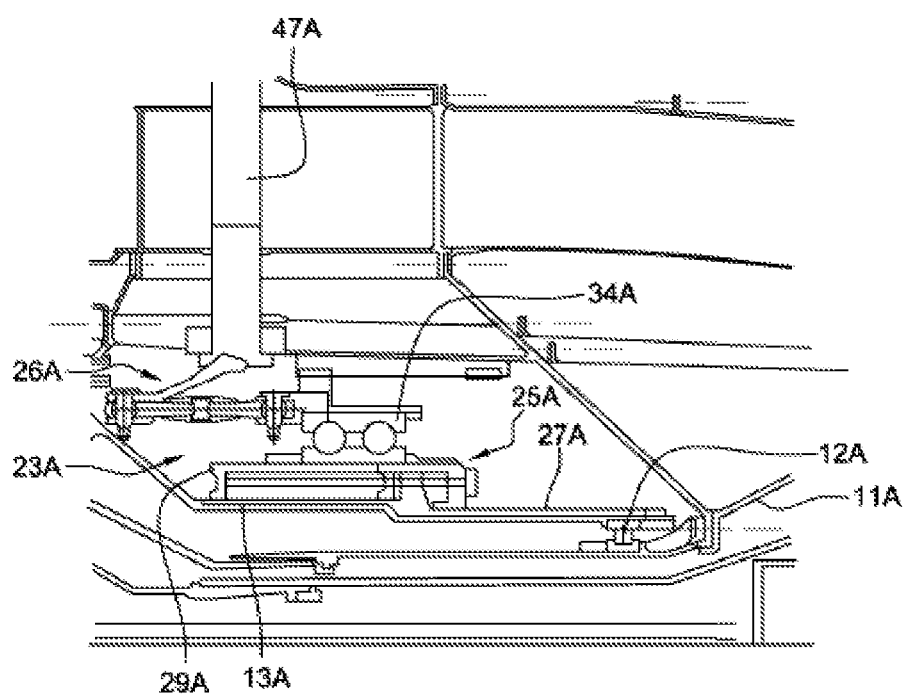
FIG. 2 is an example of a system for changing the pitch of blades of a propeller according to an example of the prior art.

In FIG. 1 and in the rest of the description is shown a turboprop with a non-streamlined fan with longitudinal axis X intended to be provided on an aircraft. However, the invention can apply to other types of turbomachine.

The turbomachine 1 comprises a nacelle 2 in which is arranged a gas generator that comprises, from upstream to downstream, a set of compressors 3, a combustion chamber 4 and a set of turbines 5. A nozzle 8 is arranged downstream from the gas generator.

In this invention, and generally, the terms "upstream" and "downstream" are defined in relation to the circulation of the gases in the turbomachine.

The set of compressors 3 can include one or two compressor(s) according to the architecture of the simple- or double-stage gas generator. The set of turbines 5 can include a high-pressure turbine and a low-pressure turbine, or two turbines (high pressure and intermediate pressure) and a low-pressure turbine. The gas generator drives the low-pressure turbine about the longitudinal axis X.

The turbomachine comprises a counter-rotating propeller doublet with an upstream propeller 6 and a downstream propeller 7. These two upstream 6 and downstream 7 propellers are rotationally driven in counter-rotation by the low-pressure turbine by means of a mechanical transmission device 17. The upstream 6 and downstream 7 propellers are mounted coaxially to the longitudinal axis X of the turbomachine 1 and are arranged in radial parallel planes, which are perpendicular to the longitudinal axis X. In this example, the propellers 6, 7 are mounted downstream from the gas generator. The mechanical transmission device 17, shown here diagrammatically, can include a differential reduction gear or a planetary gear train housing. Naturally, it is also possible to directly drive the upstream 6 and downstream 7 propellers with the low-pressure turbine.

According to the configuration described hereinabove, the flow of air entering into the turbomachine is compressed in the set of compressors 3, then mixed with fuel and burned in the combustion chamber 4. The generated combustion gases then pass into the turbines 5 in order to drive, via the mechanical transmission device 17, the propellers 6, 7 in reverse rotation, which provides most of the thrust. The combustion gases are expelled through the nozzle 8 that participates in the thrust of the turbomachine 1. The gases pass through a flow duct for the gases extending substantially axially in the turbomachine between the nacelle 2 and a median casing 56 associated with the gas generator.

Figure 3:
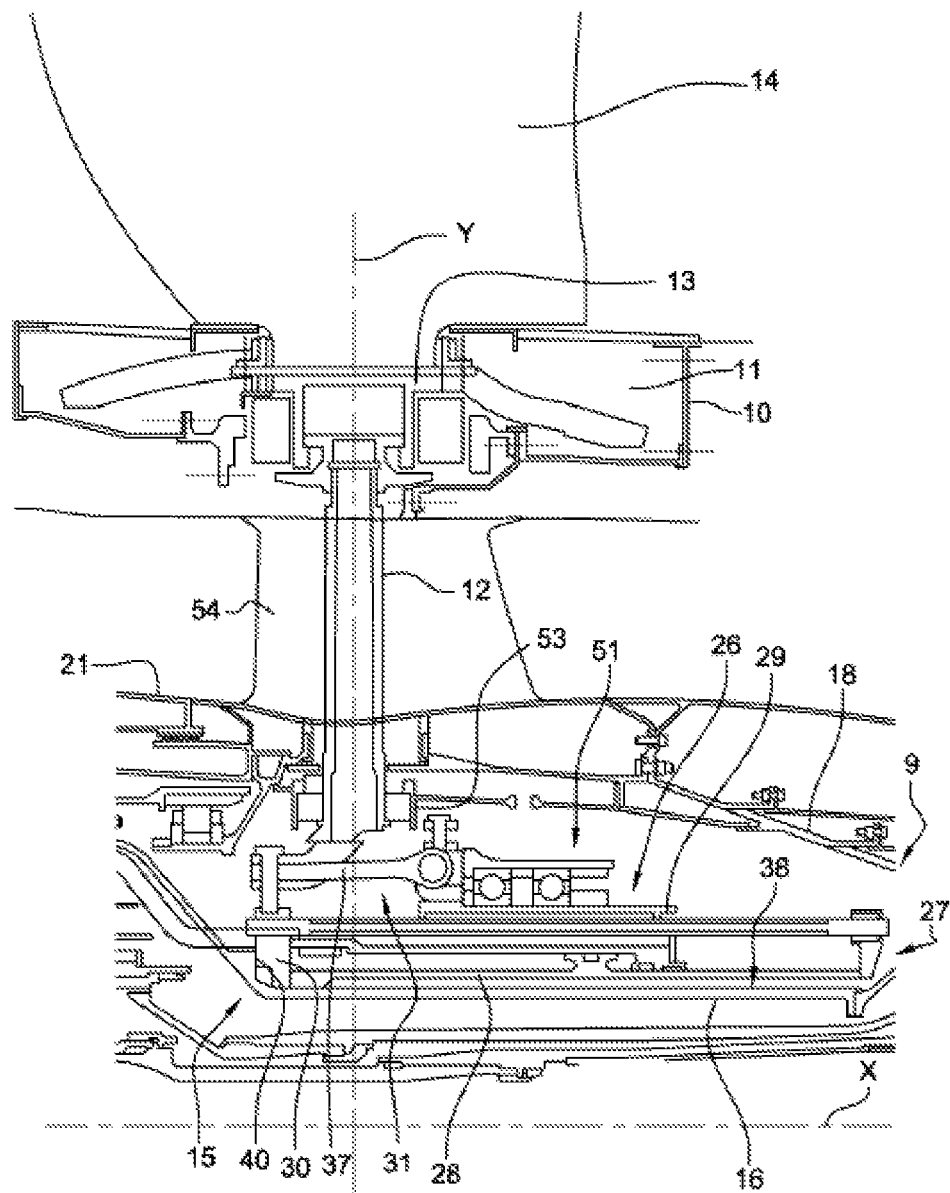
FIG. 3 is an axial cross-section view where are shown in more detail and diagrammatically elements of a pitch-changing system connected to a blade of a propeller according to the invention.
Figure 4:
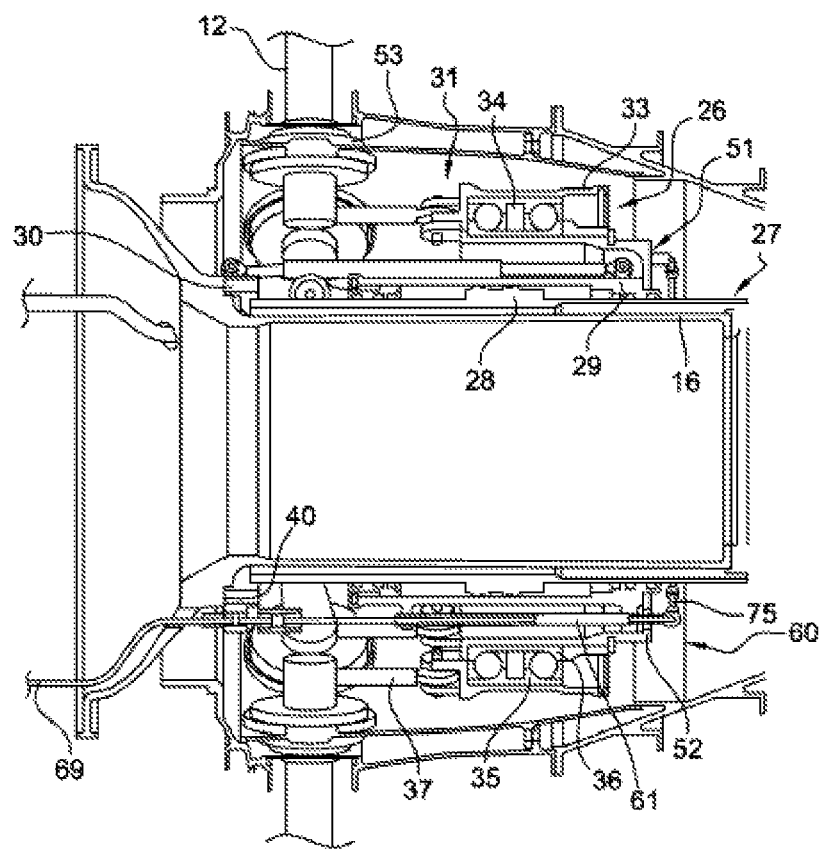
FIG. 4 is a front view of a pitch-changing system in a turbomachine.

FIGS. 3 and 4 show a generally cylindrical casing 9 rotationally mounted with respect to the nacelle 2 of the turbomachine around a rotor shaft of longitudinal axis X. The cylindrical casing 9 is also connected to a corresponding portion of the mechanical transmission device 17. This rotating casing 9 or rotary casing comprises several skins or walls of revolution, including at least one outer wall 18 in relation to a radial axis Y perpendicular to the longitudinal axis X. In the rest of the description, the terms "top", "bottom", "upper", "lower" and "above" are defined in relation to the radial axis Y with respect to the gap relative to the longitudinal axis X. The rotating casing 9 comprises radial housings 11 and radial passages 53 which are coaxial and which are each intersected by a shaft 12 of radial axis Y, hereinafter radial shaft 12, connected to a root 13 of a blade 14 of a corresponding propeller 6, 7. The blades 14 extend radially outside the nacelle 2. In particular, the casing 9 comprises a polygonal ring 10, provided with radial housings 11 here cylindrical and regularly distributed over the periphery thereof. As for the outer wall 18, the latter comprises radial passages 53 here cylindrical and regularly distributed over the periphery thereof and through which the radial shafts 12 pass. The latter extend radially through a structural arm 54 that connects the polygonal ring 10 to a radially internal skin 21 of the casing 9. This radially internal skin 21 is downstream from the median casing 56. It forms a portion of the wall of the flow duct of the gases. Each radial shaft 12 is maintained in its housing 53 by means of a guide bearing in rotation, which makes it possible to keep the radial shafts in their housings 53. The rotating casing 9 is directly supported by roller bearings on a fixed casing 15 or stator casing in order to ensure the rotation thereof with respect to the longitudinal axis X. The fixed casing 15 and the rotating casing 9 are coaxial.

The turbomachine comprises a system 26 for changing the pitch of the blades 14 of the propeller 6 that makes it possible to vary the timing or the pitch of the blades 14 about their radial axes in such a way that they occupy angular positions according to the operating conditions of the turbomachine and the flight phases concerned.

In reference to FIGS. 3 and 4, the pitch-changing system 26 comprises a control means 27 that controls the change in pitch of each one of the blades 14 and a connecting mechanism 31 that connects the control means 27 to the roots 13 of the blades 14. The control means 27 is housed between the rotating casing 9 and the fixed casing 15. The control means 27 comprises an actuator which comprises a fixed body 28 and a body 29 which is mobile in translation in relation to the fixed body 28 along the axis X. The actuator is arranged in such a way as to substantially axially displace the connecting mechanism 31, which is connected to the radial shafts 12 of the blade roots in such a way that the axial displacement of the connecting mechanism 31 drives the change in the pitch of the blades. This actuator is added on the fixed casing 15. That is to say that the latter is separated from the fixed casing 15 and does not form a structural element that is a part of the fixed casing 15. The radial shafts 12 pivot about the axis Y in the radial passages 53 and radial housings 11.

The pitch-changing system 26 comprises a load-transfer module 51 provided with a load-transfer bearing 34 and arranged between the connecting mechanism 31 and the mobile body 29 in such a way as to ensure the transmission of the axial forces exerted by the mobile body 29 of the actuator. The connecting mechanism 31 comprises a set of articulated connecting rods 37 which are regularly distributed around the actuator and which are intended to act on the roots of the blades 14 via the radial shafts 12 in order to drive them in rotation about the axis Y thereof. There are as many connecting rods 37 as there are blades. The actuator in this invention advantageously comprises an annular cylinder having a stem mobile in relation to a fixed cylinder secured to the fixed casing 15.

Figure 5:
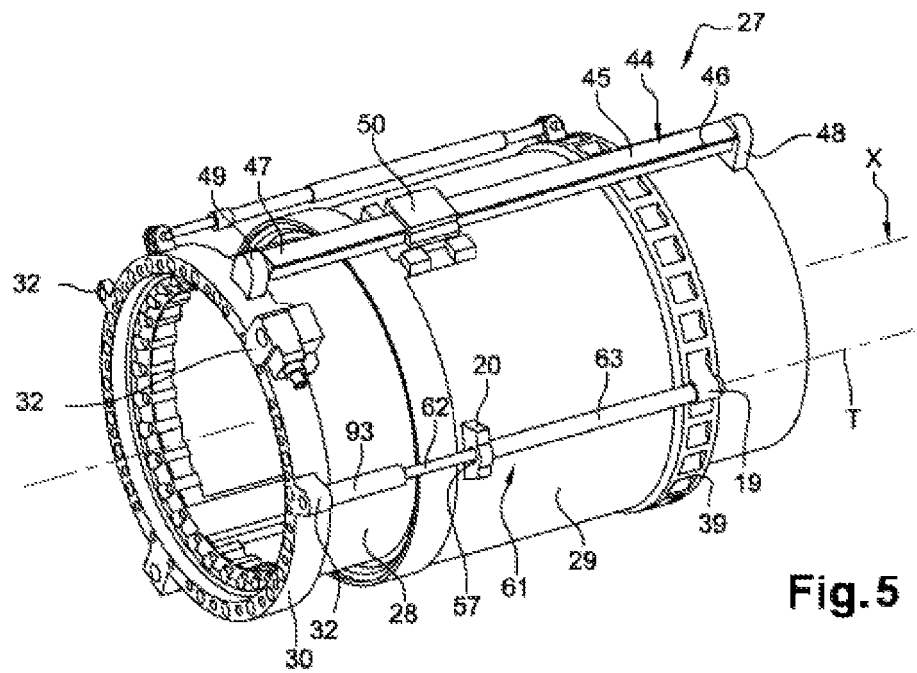
FIG. 5 is a perspective view of an example of a control means according to the invention.

In reference to FIG. 5, in which the actuator is shown more precisely, the fixed body 28 is here cylindrical with a circular section. This fixed body 28 surrounds a cylindrical wall 16 of the fixed casing 15 and is secured to this cylindrical wall 16 in such a way as to be immobilised in rotation and in translation in relation to the fixed casing 15 (see FIG. 4). For this purpose, the fixed body 28 comprises a connection ring 30 provided at an upstream end of the fixed body 28 and abutting against a shoulder 40 of the fixed casing 15. The connection ring 30 is mounted on the fixed casing 15. The mobile body 29 is arranged around the fixed body 28. In this way, the mobile body 29 is axially displaced under the action of a command of the actuator. The mobile body 29 is displaced solely in translation. The latter 29 is immobilised in rotation in relation to the fixed body by means of an anti-rotation device 44 fixed to the fixed body 28 and to the mobile body 29. This anti-rotation device 44 makes it possible in particular to prevent the rotation of the mobile body 29 around the fixed body 28 during the operation of the turbomachine. The anti-rotation device 44 comprises a crossbeam 45 extending along an axis substantially parallel to the axis X. The crossbeam 45 has a first end 46 connected to a clevis mounting 48 fixed to the downstream edge of the fixed body 28 and a second opposite end 47 connected to a base 49 provided on the connection ring 30. The anti-rotation device 44 further comprises a support 50 fixed on the mobile body 29 acting as a radial abutment. This support 50 is intersected by the crossbeam 45 and also allows for the guiding of the mobile body 29 during the axial displacement thereof.

The connection ring 30 is provided with connection interfaces 32 allowing for the connection of various pieces of equipment required for the supply and the operation of the actuator. These connection interfaces 32 comprise mechanical, hydraulic and/or electrical connectors that provide the passage for the low-pressure and high-pressure hydraulic control ducts (high flow rate and pressure).

Figure 6:
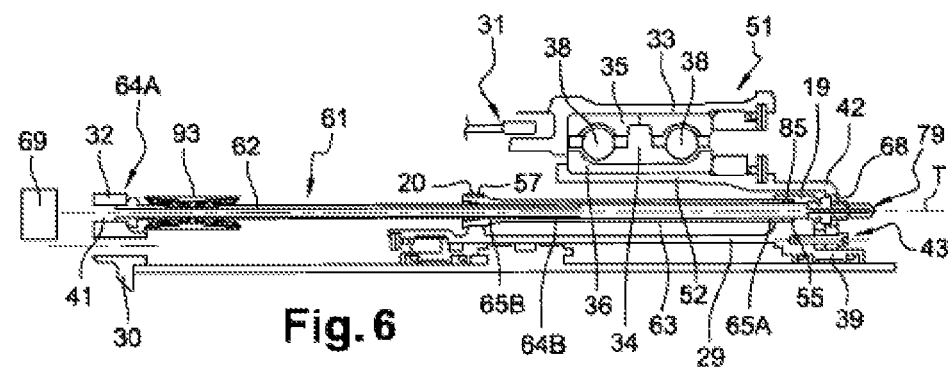
FIG. 6 is an axial cross-section view of the control means cooperating with means for lubricating according to the invention.

In reference to FIG. 6, the load-transfer module 51 comprises an annular outer ferrule 33 and inner ferrule 52. The outer ferrule 33 is connected to the connecting mechanism 31 while the inner ferrule 52 is connected to the mobile body 29. To this effect, the inner ferrule 52 comprises an annular flange 42 extending along the radial axis Y and being secured to a downstream end 39 of the mobile body 29. Fastening means such as screws 43 make it possible secure the flange 42 to the mobile body 29. The bearing 34 comprises an outer ring 35 secured to the ferrule 33 and an inner ring 36 secured to the ferrule 52. The bearing 34 is here formed by a double-row ball bearing 38, which can be of the slanted contact type oriented in opposite directions in such a way as to optimise the transmission of the axial forces.

The pitch-changing system 26 of the blades comprises means 60 for lubricating the load-transfer bearing 34 comprising at least one lubricant duct 61 which is configured to be connected to a source of supply 69 of lubricant for the supply thereof. This source of supply 69 is installed on the fixed parts of the turbomachine. The duct 61 extends radially outside the mobile body 29 with respect to the longitudinal axis X. In other terms, the duct 61 extends radially above the mobile body 29 and the fixed body 28. The duct also extends axially along an axis T parallel to the longitudinal axis X. The latter is connected on one side to the ring 30 on which is connected the source of supply 69 of lubricant and on the other side to the mobile body 29. In this example, the duct 61 is formed from a first 62 and from a second 63 tubular parts extending along the axis T.

In FIG. 6, the first part 62 has a first upstream end 64A which is received in a first cavity 41 of an interface 32 of the ring 30 wherein it is fixed. This first upstream end 64A is fixed by screwing or by other similar means. The second part 63 has a first end 65A, here downstream, which is hydraulically connected in a second cavity 55 of a first local boss 19 positioned at the downstream end 39 of the mobile body 29 of the actuator. The first and second parts 62, 63 are telescopically slidably mounted with respect to one another along the axis T. In particular, the first part 62 slides in the second part 63. Naturally, the second part 63 can be arranged in such a way as to slide in the first part 62. In other terms, the first part 62 is fixed in relation to the fixed body 28 and the second part 63 is axially displaced according to the displacement of the mobile body 29 in relation to the fixed body 28.

Figure 7:
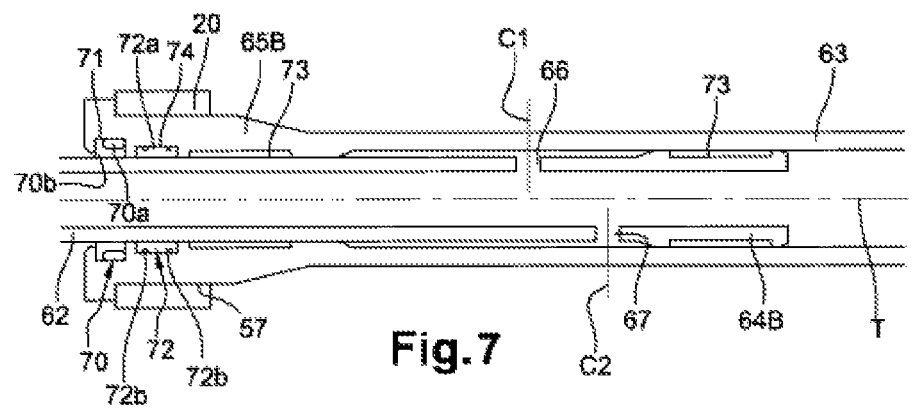
FIG. 7 is an axial cross-section view of a part of the control means showing first and second telescopic parts of means for lubricating the load-transfer bearing according to the invention.

In reference to FIG. 7, the first part 62 comprises on its second free downstream end 64B, which slides inside the second part 63, a first vent hole 66 with a central axis C1 perpendicular to the axis T. A second vent hole 67 with a central axis C2 perpendicular to the axis T is also provided on the second free end 64B of the first part 62. The central axes C1, C2 of these first and second vent holes 66, 67 are offset in relation to one another and are defined in substantially parallel planes. A second free end 65B of the second part 63 is maintained radially in position and guided by a bore 57 formed in a second local boss 20 of the mobile body 29. The second free end 65B comprises guiding segments 73 in order to provide the correct guiding between the first and second parts of the duct. These guiding segments 73 are split and installed in shallow grooves (not shown) formed in the wall of the second part 63.

The means 60 for lubricating comprise sealing means that provides the seal between the first part 62 and the second part 63 of the duct 60. In FIG. 7, the sealing means comprise a first seal 72 that makes it possible to sustainably create the seal between the first and second telescopic parts 62, 63. This first seal 72 is of the dynamic type as the latter must authorize the relative displacement of the second part 63 in relation to the first part 62. This dynamic seal 72 comprises a first element 72a and at least one second element 72b made from a polymer material. Here, two second elements 72b are provided. The first and second elements 72a, 72b are formed from different polymer materials. Advantageously, but in a non-limiting manner, the first element 72a is made from an elastomer and the second elements 72b are made from polytetrafluoroethylene or equivalent. The first element 72a substantially has the shape of a T. The two second elements 72b have an annular shape and rest on the branches of the T of the first element 72a. In particular, the second elements 72b are on either side of the foot of the T. This seal 72 is mounted in a first groove 74 formed in the wall of the second part 63. The first groove 74 is directed towards the outer wall of the first part 62 of the duct 61. Once mounted, the first element 72a made of elastomer is crushed or compressed by the wall of the second part 63 and the two branches of the T of the first element 72a rise respectively on either side of the second elements 72b.

These sealing means also comprise a second annular wiper seal 70 installed on the free end 65B of the second part 63. The second wiper seal 70 makes it possible to clean the outer wall of the second part 62 of the duct of any deposits of dirt (dust, sand, etc.) during the sliding of the second part 63, so as to preserve the physical integrity of the first seal 72. This second wiper seal 70 is housed in a second open groove 71 formed in the wall of the second part 63. The second groove 71 is directed towards the outer wall of the first part 62 of the duct 61. In this example, the second wiper seal 70 comprises a first part 70a and a second part 70b made from a polymer material. The first part 70a of the second wiper seal 70 is made from an elastomer and the second part 70b is made from polytetrafluoroethylene or equivalent. The second part 70b has a substantially L shape and is in contact with the wall of the first part 62. The first part 70a is annular and is inserted between the second part 70b and the inner wall of the second duct part 63. The first part 70a makes it possible to compress the second part 70b in such a way that the latter can scrape the outer wall of the first part 62.

Figure 12:
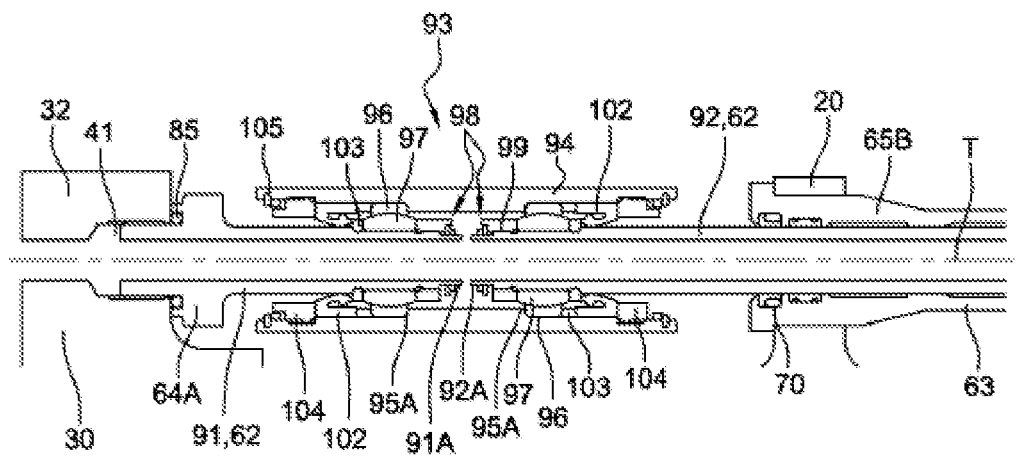
FIGS. 12 and 13 show embodiments of a connecting member of the means for lubricating according to the invention.

The sealing means 60 further comprise seals 85 arranged around first ends 64A, 65A of the first and second parts 62, 63 at the location of the fastening thereof with the mobile body and the fixed body (see FIGS. 6 and 12).

Figure 8:
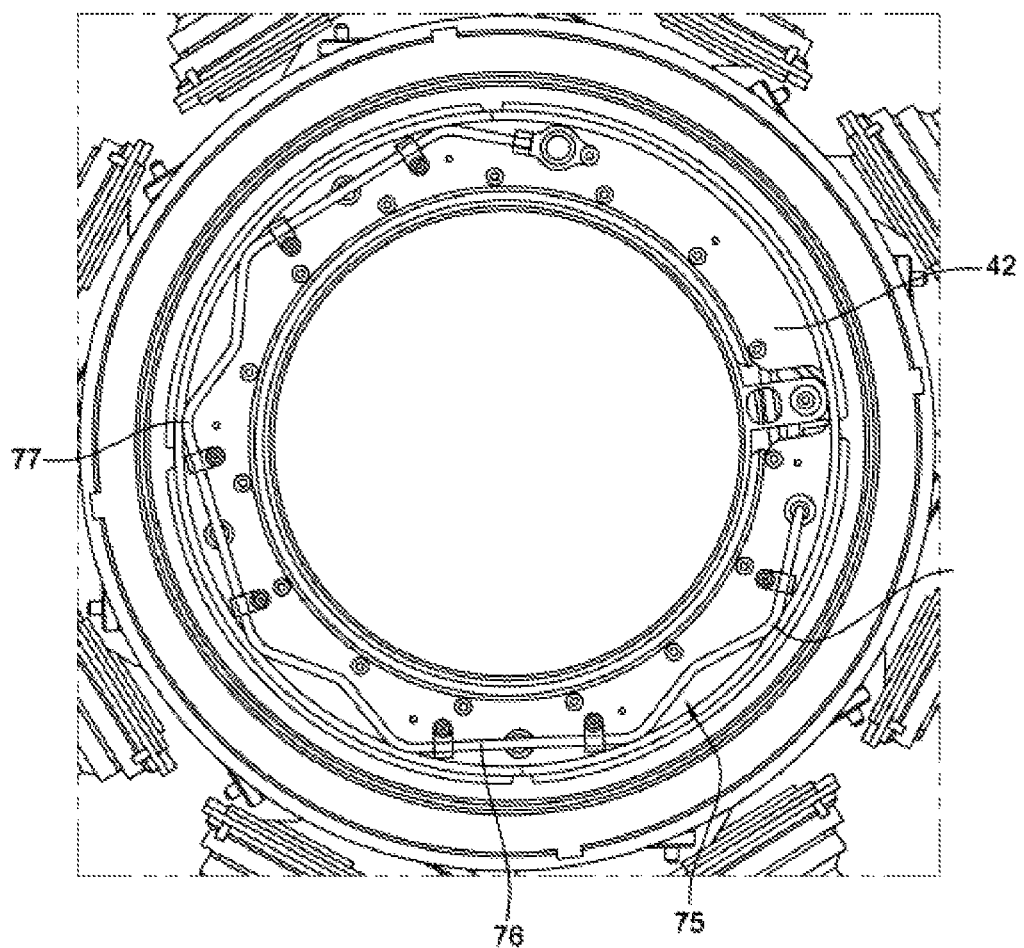
FIG. 8 shows a rear view of the control means on which is arranged a supply conduit.

FIGS. 8 and 9 show a lubricant supply conduit 75 of the means 60 for lubricating, with this conduit transferring the lubricant from the duct 61 to the bearing 34. For this purpose, the conduit 75 comprises a tubular body 76 which is arched and which is arranged at least partially around the actuator and in particular downstream from the mobile body 29. The supply conduit 75 comprises an inlet end 78 that is hydraulically connected in the cavity 55 of the first local boss 19 of the mobile body 29. For this, the inlet end 78 is provided with a connector 79 that comprises a body 80 with a passage orifice and a hydraulic connection nut 81 mounted on said body 80. More precisely, the conduit 75 is fixed on the rear face of the inner ferrule 52 (see FIG. 8). The rear face is carried by the flange 42. The latter comprises holes 68 (see FIGS. 6 and 10) that pass through the wall of the flange 42 and of which one is intersected by the connector 79. The conduit 75 is fastened by means, for example, of flexible collars 77. Such flexible collars 77 are connected to curved portions of the tubular body 76 in such a way as to create flexibility. The conduit 75 also comprises a plurality of axial tubes 82 which are each connected to the body 76 by a first end 83. The second end 84 axially opposite each axial tube 82 comprises a fastening tip 106 intended to connect to means for spraying 86 lubricant in the load-transfer bearing 34. The axial tubes 82 pass through the holes 68 arranged in the wall of the flange 42 and axially extend outside the mobile body 29. In particular, the tubes 82 are arranged between the mobile body 29 and the inner ferrule 52. The supply conduit 75 is made from a metallic material. The connector 79 is also made from a metallic material adapted to the metallic material of the first local boss 19 of the mobile body 29.

In reference to FIGS. 10 and 11, spraying means 86 of the means for lubricating are mounted on the inner ferrule 52 of the load-transfer module 51. The inner ferrule 52 comprises an annular skirt 87 extending along the radial axis Y and on which are fixed the spraying means 86 with suitable fastening members. The spraying means 86 are azimuthally distributed about the longitudinal axis X. The inner ferrule 52 is also provided with an orifice 88 with a radial axis that passes through the wall on either side radially. The inner ring 36 of the bearing 34 also comprises an opening 89 with a radial axis that passes through the wall thereof on either side radially. The axes of the opening 89 and of the orifice 88 are coaxial. At least one portion of the spraying means 86 extends radially through the orifice 88 and the opening 89 in such a way as to spray the lubricant inside the bearing 34 and directly on the bearings 38. Correct targeting of the spraying means 86 is achieved by the centring means 90 arranged on the inner ferrule 52 in such a way as to orient and centre the spraying thereof. These centring means 90 are advantageously, but in a non-limiting manner, centring sockets which are fixed on the skirt 87 of the inner ferrule 52. Fastening elements, such as screws, allow for the fastening of the sockets. Alternatively, the positioning of the spraying means can be achieved by pins.

The spraying means 86 comprise, in this example, nozzles 107. For each row of bearings at least two nozzles 107 are provided in such a way as to prevent risks of obstruction of one of the nozzles. Advantageously, the nozzles 107 are arranged and distributed with respect to one another along an angular section of about 180° for even cooling and lubrication of the bearings. However, the nozzles 107 can be arranged near one another for the purposes of integration. The position of the nozzles 107 is governed by integration constraints.

Figure 13:
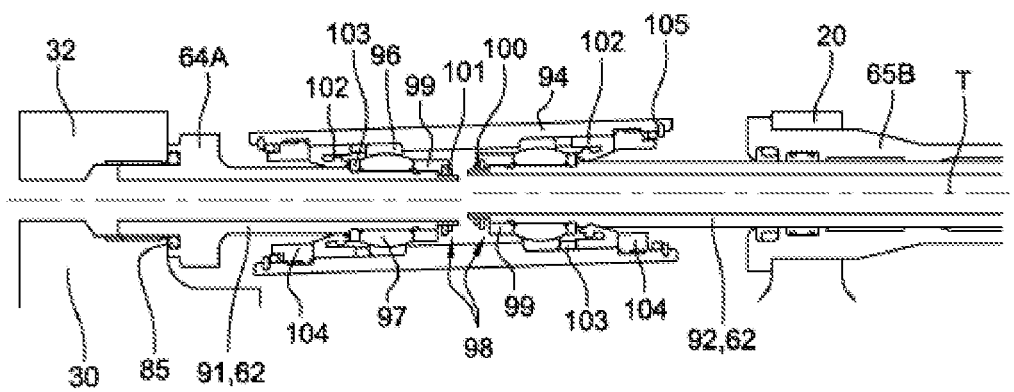

According to another aspect of the invention such as shown in FIGS. 12 and 13, the first tubular part 62 of the duct 61 is formed from at least one first tubular portion 91 and from a second tubular portion 92, which are connected together by a connecting member 93 configured in such a way as to allow for the misalignment of the first part 62 and the second part 63 of the duct 61. As described above, the first end 64A of the first part 62 is fastened on the ring 30 of the actuator via an interface 32. This fixed connection imposes the direction of this first part 62, which is fixed in relation to the second part 63. The connecting member 93 and the first part 62 formed from these two portions 91, 92 make it possible to resolve the misalignment problems that can arise between the first and second parts of the duct 61 during the axial displacement of the mobile body 29 of the actuator. These misalignment problems can be due to manufacturing deviations, namely, geometrical tolerances, assembly tolerances between different parts of the actuator, and/or the deformation of the actuator undergoing the radial forces of the rotating part.

The outer connecting member 93 comprises a substantially cylindrical wall 94 that surrounds the free ends 91A, 92. A of the first and second tubular portions 91, 92. At each free end 91A, 92A a ball-joint connection 95 is arranged. Each ball-joint connection 95 is interposed between a wall of the first and second tubular portions 91, 92 and the wall 94 of the connecting member 93. The ball-joint connection 95 is advantageously, but in a non-limiting manner, achieved by a plain bearing that has an outer ring 96 and an inner ring 97. The wall 94 of the connecting member 93 carries the outer ring 96 while the wall of each first and second portion respectively carries an inner ring 97. The plain ball-joint bearing is slidably mounted in such a way as to allow for the pivoting and tipping of the connecting member 93 such as shown in FIG. 13 in case of misalignment. A system 98 for fastening the plain ball-joint bearing arranged on the edge of each free end 91A, 92A makes it possible to maintain the ball-joint bearings on the tubular portions. This fastening system 98 comprises an inner nut 99 and a locknut 100 that axially locks the inner ring 97 of the plain ball-joint bearing. Also provided is an elastic ring 101 for maintaining the locknut. Sealing elements 102 are axially installed on either side of the two ball-joints. The sealing elements 102 can be a lip seal or an O-ring. In order to be able to use standard elements, a spacer 103 is placed axially between an inner ring 97 and a sealing element 102 of each plain ball-joint bearing. An outer nut 104 and the locking system 105 thereof make it possible to finalise the mounting. The outer nut 104 and the locking system 105 are carried by the connecting member 93, in particular the wall 94.

The invention claimed is:

1. A system for changing a pitch of a plurality of blades of at least one turbomachine propeller having the plurality of blades, the system comprising:
    a control means acting on a connecting mechanism that is connected to the plurality of blades of the propeller, the control means having a fixed body and a mobile body which translates along a longitudinal axis with respect to the fixed body;
    a load-transfer module arranged between the connecting mechanism and the control means, the load-transfer module having at least one load-transfer bearing mounted on the mobile body and cooperating with the connecting mechanisms; and
    means for lubricating the load-transfer bearing, comprising:
        at least one lubricant duct configured to be connected to a source of supply of lubricant, the lubricant duct extending radially outside the mobile body with respect to the longitudinal axis and comprising at least a first and second part being tubular and telescopically slidably mounted with respect to one another along an axis parallel to the longitudinal axis, the first part connected by a first upstream end to the fixed body and the second part connected by a first downstream end to the mobile body;
        means for spraying lubricant into the load-transfer bearing mounted on the mobile body; and
        at least one lubricant supply conduit mounted on the mobile body and configured to transfer the lubricant from the at least one lubricant duct to the spraying means.

2. The system of claim 1, wherein the first part slides inside the second part.

3. The system of claim 1, wherein the first part comprises a first end fixed to a connection ring of the fixed body, the connection ring secured to a fixed casing of the turbomachine.

4. The system of claim 3, wherein the first part is positioned in a vicinity of a second free end of the first part with at least one first vent hole having a first central axis and a second vent hole having a second central axis, the first and second central axes being perpendicular to the longitudinal axis and being defined in offset and substantially parallel planes.

5. The system of claim 1, wherein the first part is formed from first and second tubular portions aligned substantially along the same axis, the first and second tubular portions connected together by an annular connecting member configured to maintain a seal between the first and second tubular portions in case of misalignment of the first and second tubular portions.

6. The system of claim 5, wherein a ball-joint connection is interposed at each free end of the first and second portions and between walls of the first and second portions and of the annular connecting member.

7. The system of claim 1, wherein the load-transfer module comprises an inner ferrule on which are mounted the spraying means, the inner ferrule having an orifice with a radial axis coaxial to an opening of an inner ring of the bearing, the spraying means extending at least partially through the orifice and the opening.

8. The system of claim 1, wherein the load-transfer bearing includes a double-row bearing and the spraying means comprise at least two nozzles for each row, the nozzles distributed azimuthally around the longitudinal axis.

9. The system of claim 1, wherein the at least one lubricant supply conduit comprises an arched tubular body which is arranged at least partially around the mobile body and fixed on a rear face of an inner ferrule.

10. The system of claim 9, wherein the at least one lubricant supply conduit comprises tubes extending along an axis substantially parallel to the longitudinal axis the tubes connected by a first end to the arched tubular body of the at least one lubricant supply conduit and by a second end to the means for spraying.

* * * * *